United States Patent
Gibbs et al.

(10) Patent No.: US 7,973,253 B2
(45) Date of Patent: Jul. 5, 2011

(54) NEUTRAL DRAW-OUT AUTOMATIC TRANSFER SWITCH ASSEMBLY AND ASSOCIATED METHOD

(75) Inventors: Irving A. Gibbs, Mills River, NC (US); Justin Hoglund, Wake Forest, NC (US); Cathleen Clausen, Arden, NC (US); Mark Steven Tomassi, Waynesville, NC (US); Jonathan Scott Adams, Asheville, NC (US)

(73) Assignee: Eaton Corporation, Clevaland, OH (US)

( * ) Notice: Subject to any disclaimer, the term of this patent is extended or adjusted under 35 U.S.C. 154(b) by 343 days.

(21) Appl. No.: 12/331,721

(22) Filed: Dec. 10, 2008

(65) Prior Publication Data

US 2010/0140061 A1    Jun. 10, 2010

(51) Int. Cl.
*H01H 9/20* (2006.01)
(52) U.S. Cl. ............ 200/50.17; 200/50.12; 200/50.21
(58) Field of Classification Search ...... 200/50.01–50.4; 307/43, 64, 85, 86
See application file for complete search history.

(56) References Cited

U.S. PATENT DOCUMENTS

| | | | |
|---|---|---|---|
| 2,370,039 A * | 2/1945 | Iglehart et al. ............... 200/5 R |
| 4,034,170 A * | 7/1977 | Raabe et al. ............. 200/50.12 |
| 4,423,336 A * | 12/1983 | Iverson et al. ............... 307/64 |
| 5,023,469 A * | 6/1991 | Bassett et al. ................. 307/64 |
| 5,623,135 A * | 4/1997 | Hashimoto et al. ....... 200/50.21 |
| 5,914,467 A * | 6/1999 | Jonas et al. ................. 200/1 R |
| 6,849,967 B2 | 2/2005 | Lathrop et al. |
| 6,995,327 B1 | 2/2006 | Shepstone et al. |
| 7,019,229 B1 * | 3/2006 | Weister et al. ........... 200/50.17 |
| 7,462,792 B1 * | 12/2008 | Hellmers et al. .......... 200/50.33 |
| 2007/0268656 A1 * | 11/2007 | Allen ......................... 361/643 |
| 2009/0139843 A1 * | 6/2009 | Serrano .......................... 200/18 |

* cited by examiner

Primary Examiner — Michael A Friedhofer
(74) Attorney, Agent, or Firm — Martin J. Moran

(57) ABSTRACT

An interlock assembly for a bypass isolation open or closed transition ATS assembly is disclosed. The interlock assembly ensures that a switch assembly being worked upon and/or being inserted is in a neutral configuration, i.e. the switch assembly is not engaging a power source. The interlock assembly is, preferably, an electrical interlock having a control system structured to configure the switch assemblies and to monitor the configuration of the switch assemblies. That is, the switch assemblies each include a power operated, conductive, movable contact arm. The position of each contact arm is controlled, and monitored by, the control system which controls the single actuator for each contact arm.

19 Claims, 4 Drawing Sheets

NEUTRAL DRAW-OUT AUTOMATIC TRANSFER SWITCH ASSEMBLY AND ASSOCIATED METHOD

BACKGROUND OF THE INVENTION

1. Field of the Invention

This invention relates to a bypass isolation open or closed transition automatic transfer switch assembly, commonly called an automatic transfer switch assembly (ATS assembly) and, more specifically, an ATS assembly structured to move into the neutral position prior to removal/insertion from/into an enclosure.

2. Background Information

Certain installations, e.g. hospitals, (hereinafter "the system load") must have power systems structured to provide an uninterruptable power supply. The primary power source is typically the public power grid and the secondary power source is typically a generator. Both of these sources are structured to provide power over an extended period of time. That is, the system typically draws power from the primary power source, however, if that source becomes disabled for any period of time, the secondary source is used.

An ATS assembly typically includes a first switch assembly (ATS1), a second switch assembly (ATS2), and a bypass switch assembly. Alternately, an ATS assembly may have only two switch assemblies; a first switch assembly and a bypass switch assembly. All three, or both, switch assemblies are coupled to, and in electrical communication with, the system load. Further, all switch assemblies are structured to selectively engage one power source at a time. That is, the switch assemblies are coupled to both power sources, but only one power source at a time may pass energy through the switch assembly. To accomplish this, each switch assembly has two actuators coupled to a contact arm. The contact arm is coupled to, and in electrical communication with, the load conductor. The contact arm is structured to move between three positions: in a first position the contact arm is coupled to, and in electrical communication with, the first power source; in a second position, the contact arm is coupled to, and in electrical communication with, the second power source; and in the third, neutral position, the contact arm is not in electrical communication with either power source. Each contact arm is coupled to two actuators. One actuator is structured to move the contact arm into the first position and another is structured to move the contact arm into the second position. The actuators are powered and may be controlled remotely. The power actuator also allows for manual operation of the first and second switch assemblies.

The switch assemblies are typically maintained in an enclosure. The first and second switch assemblies are removably disposed in the enclosure so that they may be removed for maintenance. The bypass switch assembly is, typically, fixed within the enclosure. Thus, the bypass switch assembly cannot be easily removed and maintenance thereon typically requires the system load (e.g. the hospital) to be powered down.

During normal operation, one of the non-bypass switch assemblies provides for electrical communication between the primary power source and the system load. For the sake of this example, the first switch assembly will be said to be in use during normal operations. Further, during normal operation, the second switch assembly and the bypass switch assembly will be in the neutral position. If maintenance needs to be performed on the first switch assembly, the following operation occurs. First, the bypass switch assembly contact arm is moved to engage, that is, be in electrical communication with, the same source as the first switch assembly. The first switch assembly is then moved into the neutral position. The first switch assembly may then be removed from the enclosure for maintenance.

During maintenance, the bypass switch assembly is used to supply energy to the system load. There is, however, a danger of accidentally having both sources of power coupled to the system load during maintenance operations; this occurs when either the switch assembly being serviced is configured to be coupled to the alternate power source prior to reinsertion, or, when the bypass switch assembly is switched over to the alternate power source while the switch assembly is being serviced and that switch assembly is not reconfigured prior to insertion. There is also a danger that an error may be made when configuring the closed transition automatic transfer switch assembly prior to removing the switch assembly to be serviced. That is, the bypass switch assembly may be accidentally left in a neutral configuration when the switch assembly being serviced is being removed. When this occurs, if the switch assembly being removed is the active switch assembly, there is a strong possibility that arcing will occur as the active switch assembly is disengaged from the power source.

SUMMARY OF THE INVENTION

The disclosed concept provides for an interlock assembly that ensures that the switch assembly being worked upon and/or being inserted is in a neutral configuration, i.e. the switch assembly is not engaging either power source. The interlock assembly, preferably, includes at least one electrical interlock having a control system structured to configure the switch assemblies and to monitor the configuration of the switch assemblies. That is, the switch assemblies each include a power operated, conductive, movable contact arm. The position of each contact arm is controlled, and monitored by, the control system which controls the actuator for each contact arm.

The interlock control system also includes sensors disposed in the enclosure and on the racking mechanism, which is structured to move the switch assemblies in and out of an enclosure. That is, the switch assemblies are removably disposed in an enclosure and each switch assembly includes a racking mechanism structured to allow a user to move the switch assemblies out from or, into, the enclosure. The interlock is structured to detect use of one of the racking mechanisms and to move the associated switch assembly into the neutral position.

Further, the interlock control system includes sensors structured to detect which power source is being used to supply the bypass switch assembly. The interlock control system utilizes this information to ensure that when a switch assembly, which has been in the neutral position, is re-engaged, that switch assembly is coupled to the source being used by the bypass switch assembly. This ensures that the system load will not be coupled to, an in electrical communication with, two separate power sources.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
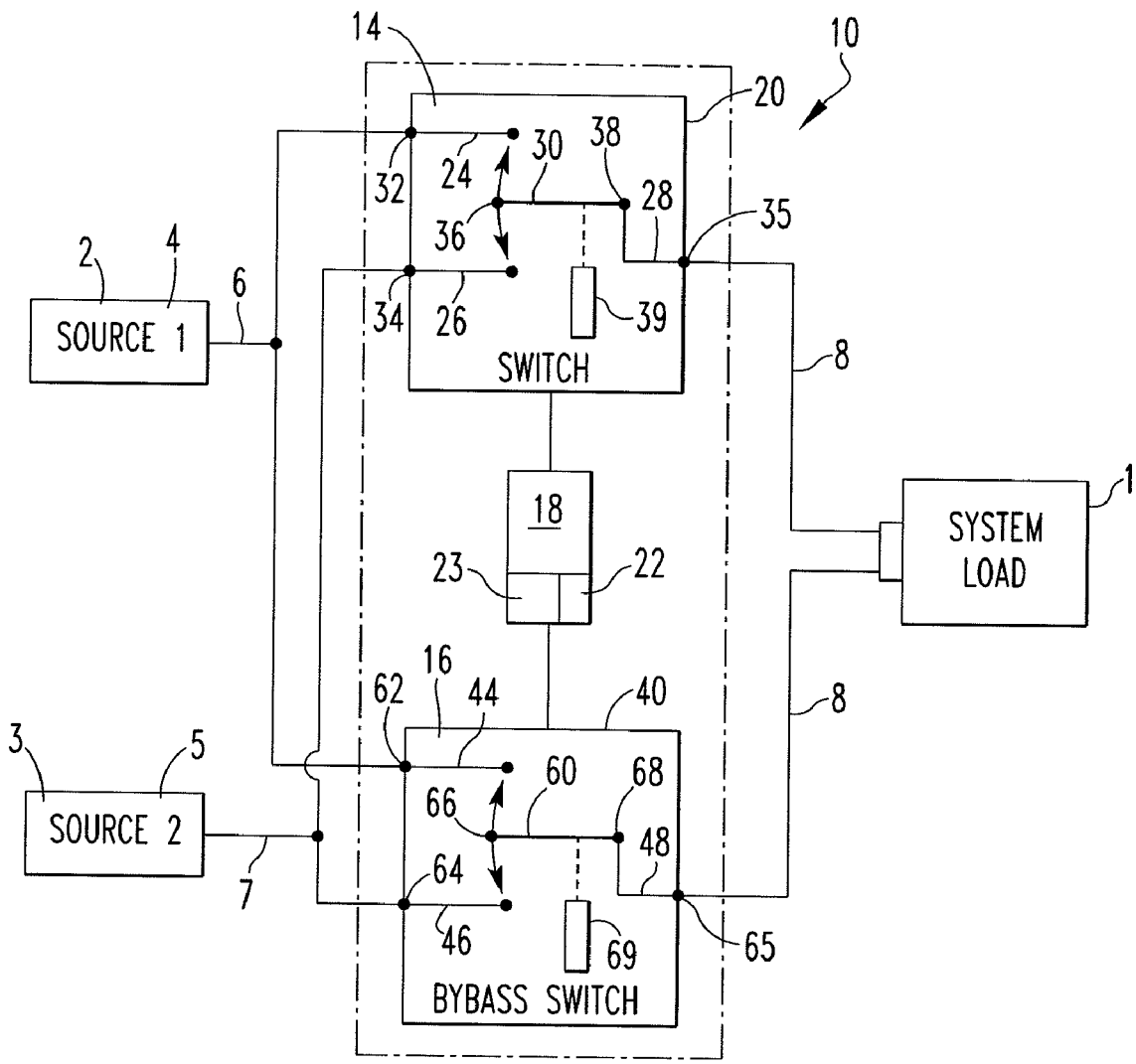
FIG. 1 is a schematic view of a power system having a system load, a first source of power, a second source of power and a transfer switch assembly.

As used herein, "coupled" means a link between two or more elements, whether direct or indirect, so long as a link occurs.

As used herein, "directly coupled" means that two elements are directly in contact with each other.

As used herein, "fixedly coupled" or "fixed" means that two components are coupled so as to move as one while maintaining a constant orientation relative to each other.

As used herein and with reference to electrical components, "engage" shall mean temporarily coupled and allowing for electrical communication.

As used herein, a "power operated movable contact arm" is a contact arm structured to be moved by a motor or similar device. The motor may be remotely actuated, thus, the "power operated movable contact arm" may be remotely actuated.

As used herein, a "system load" is any load downstream of a transfer switch assembly but is, typically, a large installation such as, but not limited to, a building or manufacturing plant.

As used herein, a "transition overlap" is the time during which a system load is receiving energy from two separate sources.

It is further understood that when elements intended to convey electricity (or power/energy) are "coupled and in electrical communication" the elements are structured to convey electricity from the line to the load. Conversely, the "control system 18" (discussed below) and associated elements may be described as "electrically coupled," meaning that the elements communicate electronically, typically by sending an electronic pulse or other electrical signal.

It is noted that the interlock assembly 90 recited in the claims utilizes components on both the switch assemblies 14, 16 and the enclosure 12 in which the switch assemblies 14, 16 are disposed (all described below). The following description will first discuss the elements of the bypass isolation open or closed transfer switch (ATS) assembly 10 (described below) and then identify which elements thereof, as well as any additional elements, comprise the interlock assembly 90. It is further noted that the interlock assembly 90 may operate with a transfer switch assembly 10 which utilizes three switch assemblies, i.e. two switch assemblies and a bypass switch assembly; however, as set forth below, the elements and operation of the interlock assembly 90 may be described with reference to a transfer switch assembly 10 having only two switch assemblies 14, 16, i.e. a first switch assembly and a bypass switch assembly 16. Such a two-switch ATS assembly 10 is described in U.S. patent application Ser. No. 12/331,674, filed contemporaneously herewith and incorporated by reference.

As shown schematically in FIG. 1, a system load 1 is structured to receive energy from two separate sources, a first source 2 and a second source 3. The energy sources 2, 3 may be, but not limited to, an electrical grid 4 and a generator 5. More specifically, electricity is provided by a first source conductor 6 and a second source conductor 7. Similarly, the system load 1 has a system load conductor 8. The source and load conductors 6, 7, 8 terminate in "stabs" disposed within the enclosure 12 (discussed below). As is known, each switch assembly 14, 16 (discussed below) typically includes a plurality of "quick-disconnects" which are structured to removably engage the stabs. That is, stabs are typically a rigid conductive member and the quick-disconnects include a plurality of fingers disposed in a pincer-like configuration and structured to "pinch," i.e. be biased against, the stabs. Each switch assembly 14, 16 may be moved between a first position, wherein the switch assembly is not coupled to the stabs, and may be removed from the enclosure 12, and a second position, wherein the switch assembly 14, 16 is coupled to, and in electrical communication with, the stabs (and is disposed within the enclosure 12). Energy from the energy sources 2, 3 reaches the system load 1 via a bypass isolation open or closed transition automatic transfer switch assembly (ATS assembly) 10. The first source conductor 6, the second source conductor 7, and the system load conductor 8 are each structured to removably engage, that is, be in electrical communication with, a corresponding line/load conductor on the ATS assembly 10 as described below.

Figure 2:
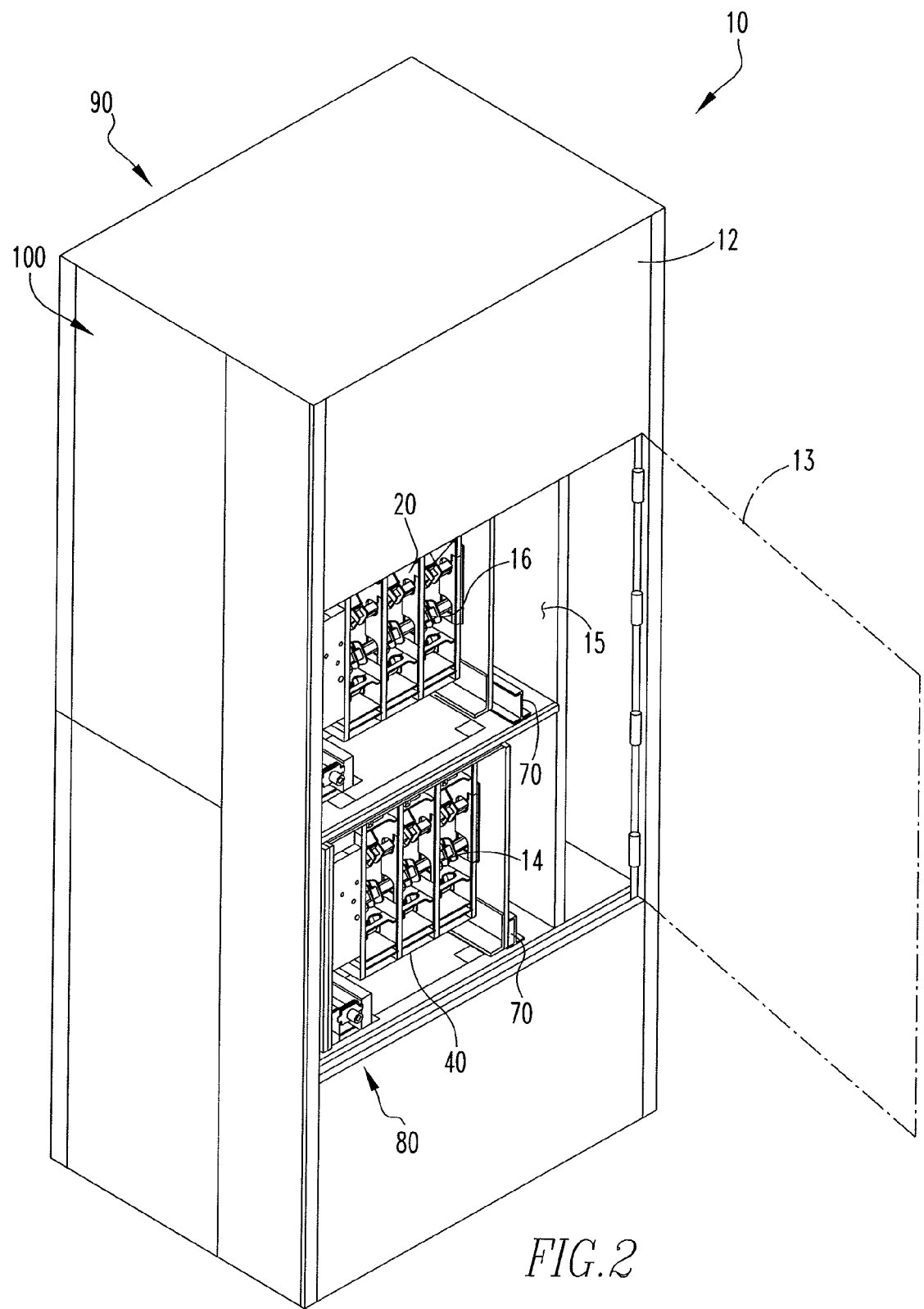
FIG. 2 is an isometric view of an ATS assembly.

As shown in FIGS. 1 and 2, the ATS assembly 10 includes an enclosure 12, a first switch assembly 14, a bypass switch assembly 16, a control system 18, and an interlock assembly 90. The enclosure 12 includes a movable door 13 and defines an enclosed space 15. The first switch assembly 14 and bypass switch assembly 16 are disposed in the enclosed space 15. The door 13 includes a handle assembly 17 that is structured to move the door 12 between a closed position and an open position. Further, as discussed below, the ATS assembly 10, and more specifically each switch assembly 14, 16, includes a racking mechanism 80. The door 13 supports a racking mechanism key 81 in a racking mechanism key lock 83. The racking mechanism key 81 is used to gain access to each racking mechanism 80. As set forth below, a mechanical interlock 109 ensures that the racking mechanism key 81 may not be removed from the racking mechanism key lock 83 unless the first switch assembly 14 is in the neutral position.

The first switch assembly 14 and the bypass switch assembly 16 are substantially similar and the following description shall address a "switch assembly." Two sets of reference numbers will follow the identified elements of the "switch assembly" wherein the first set of reference numbers belong to the first switch assembly 14 and the second set of reference numbers belong to the bypass switch assembly 16. As noted above, the bypass switch assembly 16 may not be removable and, as such, may not include a racking mechanism 80 or other elements associated with removal/insertion of the bypass switch assembly 16.

A switch assembly 14, 16 includes a housing 20, 40, a first line conductor 24, 44, a second line conductor 26, 46, one load conductor 28, 48, and a single power operated, conductive, movable contact arm 30, 60. Each first line conductor 24, 44 includes an electrical coupling 32, 62, such as, but not limited to, a quick-disconnect, whereby each first line conductor 24, 44 is coupled to, and in electrical communication with, the first source 2 via the first source conductor 6. Each second line conductor 26, 46 includes an electrical coupling 34, 64, such as, but not limited to, a quick-disconnect, whereby each second line conductor 26, 46 is coupled to, and in electrical communication with, the second source 3 via the second source conductor 7. Each load conductor 28, 48 includes an electrical coupling 35, 65, such as, but not limited to, a quick-disconnect, whereby each is coupled to, and in electrical communication with, the system load 1 via the system load conductor 8. Each first line conductor 24, 44, second line conductor 26, 46 and load conductor 28, 48 extends into their respective switch assembly housings 20, 40.

Each power operated movable contact arm 30, 60 is also disposed within each switch assembly housing 20, 40. Each movable contact arm 30, 60 has a first end 36, 66 and a second end 38, 68. Each contact arm second end 38, 68 is coupled to, and in electrical communication with, their respective load conductor 28, 48. Each contact arm first end 36, 66 is structured to contact either a first line conductor 24, 44, a second line conductor 26, 46, or be in a neutral position as discussed below.

Each power operated movable contact arm 30, 60 is further coupled to a single actuator 39, 69, such as, but not limited to, a motor. Each actuator 39, 69 is structured to move the associated contact arm 30, 60 between a first position and a second position, and having a neutral position therebetween. When a contact arm first end 36, 66 is in the first position the contact arm first end 36, 66 is coupled to, and in electrical communication with, the respective first line conductor 24, 44. When a contact arm first end 36, 66 is in the second position, the contact arm first end 36, 66 is coupled to, and in electrical communication with, the respective second line conductor 26, 46. When a contact arm first end 36, 66 is in the neutral position, the contact arm first end 36, 66 is not coupled to, and does not electrically communicate with, either the first or the second line conductor 24, 26, 44, 46.

Thus, each switch assembly 14, 16 is structured to have three configurations, a first configuration wherein the switch assembly 14, 16 couples, and provides electrical communication between, the first source conductor 6 and the system load conductor 8, a second configuration wherein the switch assembly 14, 16 couples, and provides electrical communication between, the second source conductor 7 and the system load conductor 8, and a neutral configuration wherein neither the first source conductor 6 nor the second source conductor 7 is coupled to, and in electrical communication with, the system load conductor 8.

The control system 18 is structured to control the switch assemblies 14, 16 and place each switch assembly 14, 16 in one of the identified configurations. The control system 18, preferably, includes a programmable logic circuit 22, (PLC or a computer chip (not shown)), input/output devices (not shown), and may include a memory device 23. The control system 18 is structured to include a routine or other logic that determines, and may record, the configuration of the switch assemblies 14, 16. More specifically, the control system 18 is structured to actuate each switch assembly actuator 39, 69. That is, the control system 18 is electrically coupled to each switch assembly actuator 39, 69 and may send a signal to the switch assembly actuator 39, 69 which causes the switch assembly actuator 39, 69 to move the associated contact arm 30, 60 to one of the first position, second position, or neutral position. Further, the control system 18 may be accessed remotely via a communications network (not shown) such as, but not limited to the Internet or a wireless communications system. Thus, each of the first switch assembly 14 and the bypass switch assembly 16 may be controlled remotely.

Figure 3:
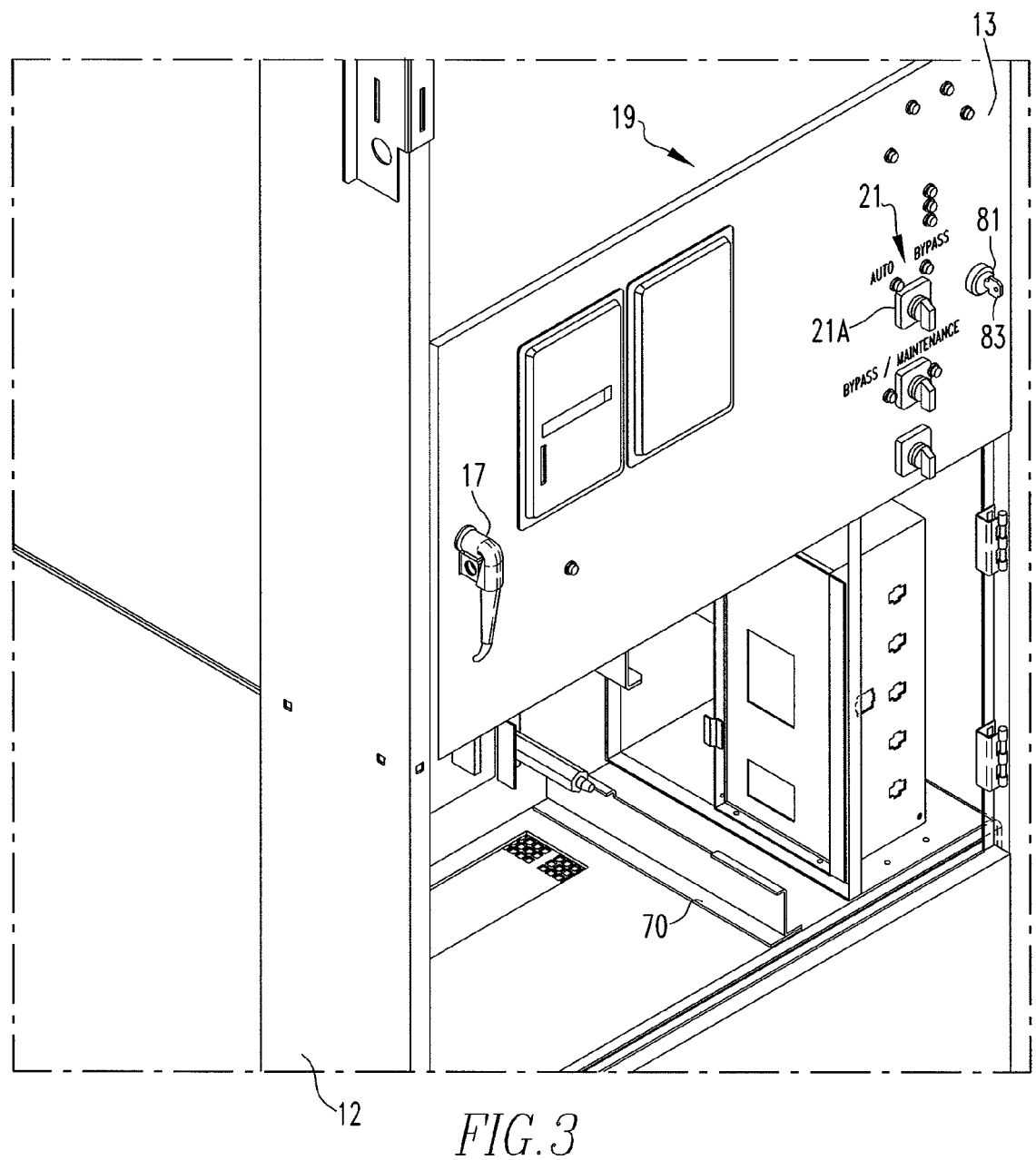
FIG. 3 is a isometric view of an ATS assembly with a door closed.

However, as shown in FIG. 3, the control system 18 may also include a control panel 19 that is adjacent to, or integrated with, the door 13. The control panel 19 includes at least one input device 21, and preferably a plurality of input devices, such as, but not limited to, toggles, knobs, and/or switches. The input devices 21 are electrically coupled to the control system 18 and provide input thereto. For example, a switch, identified in FIG. 3 as the BYPASS/MAINTENANCE SWITCH and hereinafter a switch assembly selector 21A, may be selectable between "AUTO" position, wherein during normal operation energy is being conveyed by the first switch assembly 14, and a "BYPASS" position, wherein energy is being conveyed by the bypass switch assembly 16. When, during normal operations, a user moves the switch assembly selector 21A to the "BYPASS" position, the control panel 19 provides a signal to the control system 18 and the bypass switch assembly 16 engages the active power source 2, 3 as described below. As noted above, a racking system key 81 that is used to gain access to each racking mechanism 80 is disposed on the door 13, preferably adjacent to the switch assembly selector 21A.

Figure 4:
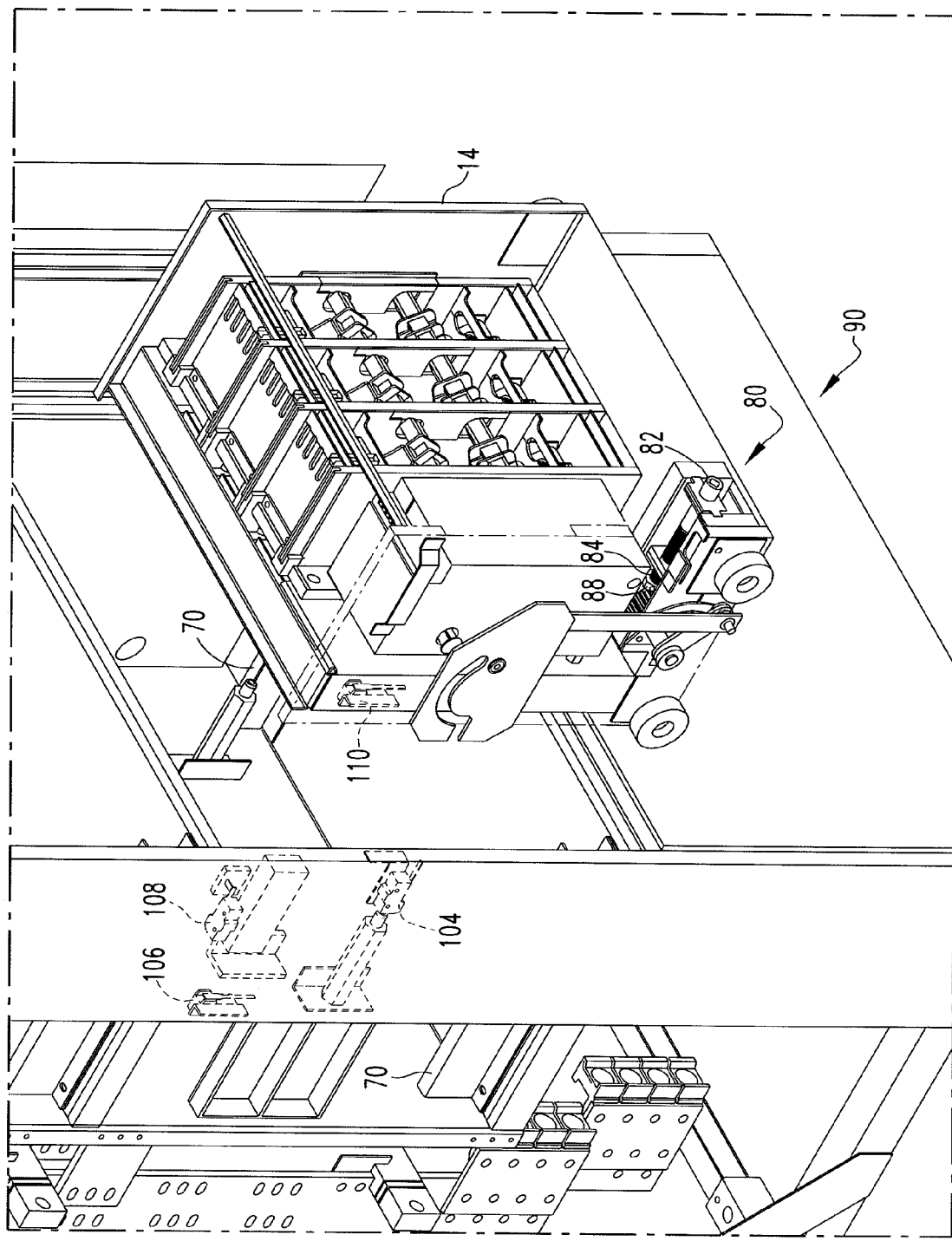
FIG. 4 isometric view of an ATS assembly with a switch assembly withdrawn from the enclosure.

As shown in FIGS. 3 and 4, both the first switch assembly 14 and the bypass switch assembly 16 are removably disposed in the enclosure 12. Preferably, the first switch assembly 14 and the bypass switch assembly 16 are roll-out devices. That is, the enclosure 12 includes sets of rails 70 upon which each of the first switch assembly 14 and the bypass switch assembly 16 may be pulled out of the enclosure 12 for maintenance or other operations.

Further, both the first switch assembly 14 and the bypass switch assembly 16 each include a racking mechanism 80, as shown in FIG. 4. The racking mechanism 80 is structured to assist a user during the engagement/disengagement of the switch assemblies 14, 16 with/from the source and load conductors 6, 7, 8. The racking mechanism 80, preferably, includes an actuator 82, such as, but not limited to, a threaded rod 84. The racking mechanism actuator 82 is, preferably, disposed behind a lockable door (not shown) which can only be unlocked by the racking mechanism key 81. Movement of the racking mechanism actuator 82, or more specifically, rotation of the racking mechanism threaded rod 84 causes the racking mechanism 80 to engage the enclosure 12 and pull the switch assembly 14, 16 into, or push the switch assembly 14, 16 out of, engagement with the source and load conductors 6, 7, 8. There are many different types of racking mechanism 80 and the specific elements and operation thereof are not relevant to the interlock assembly 90 recited in the claims below. It is, however, noted that racking mechanisms typically operate by having a component on a switch assembly engage an element on the enclosure and by having a motion, e.g. the rotation of the racking mechanism actuator 82 set forth above, cause the two elements to be drawn together or pushed apart.

The racking mechanism 80 is structured to place the switch assembly 14, 16 into three positions, an engaged position, a test position, and a withdrawn position. A switch assembly 14, 16 in the engaged position is fully within the enclosure 12 and has the switch assembly first line conductor 24, 44, second line conductor 26, 46, and load conductor 28, 48 engaging, that is, coupled to and in electrical communication with the source and load conductors 6, 7, 8. Further, the control system 18 is electrically coupled to and able to control the switch assemblies 14, 16. In the test position, the switch assembly 14, 16 is partially within the enclosure 12 and the control system 18 is electrically coupled to and able to control the switch assemblies 14, 16. Further, in the test position, the switch assembly first line conductor 24, 44, second line conductor 26, 46, and load conductor 28, 48 are not engaged with the source and load conductors 6, 7, 8. Thus, the switch assembly 14, 16 may still be controlled by the control system 18, but no energy is flowing through the switch assembly 14, 16. In the withdrawn position, the switch assembly 14, 16 is substantially, or entirely, out of the enclosure 12. Typically, the switch assembly 14, 16 is moved onto a cart or other service device (not shown) for transport or maintenance. This means that the switch assembly first line conductor 24, 44, second line conductor 26, 46, and load conductor 28, 48 are not engaged with the source and load conductors 6, 7, 8 and the control system 18 is decoupled, and cannot control, the switch assemblies 14, 16.

As shown in FIG. 4, the interlock assembly 90 includes a sensor system 100 as well as the elements described above and further identified below, with which the sensor system 100 interacts. Generally, to avoid the situations, set forth above, where an ATS assembly 10 couples a system load 1 to two power sources 2, 3, or to prevent the removal of a switch assembly 14, 16 when coupled to, and in electrical communication with, a power source 2, 3, the interlock assembly 90 is structured to move the first switch assembly 14 into the neutral configuration when the door 13 to the enclosure 12 is opened and/or when the racking mechanism 80 is in use. As described below, the normal procedure for removing the first switch assembly 14 should cause the first switch assembly 14 to move the first switch assembly 14 into the neutral configuration, thus the interlock assembly 90 acts as a safety measure.

Typically, the door 13 to the enclosure 12 is opened for maintenance, thus the interlock assembly 90 is structured to detect when the door 13 is opened and moves the first switch assembly 14 to the neutral position at this time. In certain instances, the door 13 may not be in place, or may not be coupled to the interlock assembly 90, or sensor system 100. Thus, another indication that the first switch assembly 14 is being installed/removed, is the movement of the first switch assembly 14 caused by actuation of the racking mechanism 80. Therefore, the interlock assembly 90 may also be structured to detect movement of the first switch assembly 14 and to move the first switch assembly 14 to the neutral position at this time. Finally, and as noted above, the first switch assembly 14 and the bypass switch assembly 16 are substantially similar. The following discussion addresses the interlock assembly 90 and the sensor system 100 interacting with the first switch assembly 14; it is understood that similar sensors 102 may be associated with the bypass switch assembly 16 resulting in the interlock assembly 90 providing protection to both switch assemblies 14, 16.

The sensor system 100 includes at least one sensor 102 and, preferably, includes a door sensor 104, a racking mechanism sensor 106, and a position sensor 108. Each sensor 102 is electrically coupled to the control system 18 and is structured to provide signals thereto indicating the status of an associated component. For example, the door sensor 104 is, preferably, disposed within the enclosure 12 adjacent to the door 13 handle and is structured to detect when the door 13 is moved from the closed position.

Thus, the a sensor system 100, and more specifically the door sensor 104, is coupled to the control system 18 and is structured to provide a signal to the control system 18. The sensor system 100, and more specifically the door sensor 104, is further structured to determine the position of the door 13 and to send a signal to the control system 18 when the door 13 is moved toward an open position. Further, the control system 18 is structured to receive a signal from the sensor system 100 indicating that the door 13 has moved into the open position. When the control system 18 receives a signal from the sensor system 100 indicating that the door 13 has moved into the open position, the control system 18 is further structured to move the first switch assembly 14 into the neutral configuration. Thus, a user will not typically be able to open the door 13 without the first switch assembly being moved into the neutral configuration. This greatly reduces the chance of the first switch assembly 14 being moved out of the enclosure 12 while in either the first or second configuration.

The racking mechanism sensor 106 is, preferably, disposed adjacent to the back side of the enclosure 12 and is structured to detect when the racking mechanism actuator 82 moves the first switch assembly 14. That is, the racking mechanism sensor 106 is structured to detect the proximity of the first switch assembly 14. When the first switch assembly 14 begins to move away from the back side of the enclosure 12, the racking mechanism sensor 106 detects the change in proximity and provides a signal to the control system. When the control system 18 receives a signal from the racking mechanism sensor 106, the control system 18 is structured to move the first switch assembly 14 into the neutral configuration. Thus, a user will not typically be able to utilize the racking mechanism 80 without the first switch assembly 14 being moved into the neutral configuration. This greatly reduces the chance of the first switch assembly 14 being moved into, or out of, the enclosure 12 while in either the first or second configuration.

The position sensor 108 is also located near the back side of the enclosure 12 and is structured to determine if the first switch assembly 14 is in the engaged position, the test position, or the withdrawn position relative to the enclosure 12. The position sensor 108 provides this data to the control system 18. The control system 18, or more specifically, logic, i.e. a routine or other programming in the control system 18, utilizes this data to ensure that the first switch assembly 14 is not moved into the first or second configuration until the first switch assembly 14 is in the engaged position, i.e. fully engaging the source and load conductors 6, 7, 8.

The position sensor 108, preferably, operates in conjunction with an optional configuration sensors 110 (one shown) within the first and bypass switch assemblies 14, 16. The configuration sensors 110 are electronically coupled to, and structured to provide a signal to, the control system 18. The configuration sensors 110 provide data as to the present configuration of each switch assembly 14, 16. The control system 18 is therefore further structured to move the first switch assembly 14 from a neutral configuration into a configuration corresponding to the bypass switch assembly 16. The configuration sensors 110 are further structured to allow the control system 18 to detect a loss of power in the ATS assembly 10. Thus, for example, if during a maintenance operation on the first switch assembly 14, the bypass switch assembly 16 loses power from source 1, the configuration sensor 110 detects the loss and communicates that information to the control system 18. The control system 18 then causes the bypass switch assembly 16 to switch to the second power source 3. Further, as described below, the control system 18 preferably records the position of the bypass switch assembly 16 so that, after the first switch assembly 14 is reinstalled, the first switch assembly 14 will not be coupled to a different power source 2, 3.

Thus, when operating together, the position sensor 108 and the configuration sensors 110 provide data to the control system 18 so that the control system is structured to ensure that the first switch assembly 14 is in the engaged position before the first switch assembly 14 may be moved from the neutral configuration and that, when the first switch assembly 14 is moved from the neutral configuration, the first switch assembly 14 is moved into a configuration corresponding to the bypass switch assembly 16.

Additionally, as noted above, the ATS assembly 10 is structured to ensure that the system load 1 is not without energy. Thus, the interlock assembly 90 also includes a mechanical interlock 109 coupled to the switch assembly selector 21A and the racking mechanism key lock 83. The switch assembly selector 21A sends a signal to the control system 18 to cause the bypass switch assembly 16 to move into one of the engaged configurations when the switch assembly selector 21A is actuated. That is, the bypass switch assembly 16 engages the same power source 2, 3 as the first switch assembly 14 (based on data from the configuration sensors 110) when the switch assembly selector 21A is actuated. Subsequently, the control system 18 moves the first switch assembly into the neutral configuration.

The racking mechanism key lock 83 is structured to retain the racking mechanism key 81 so long as the mechanical interlock 109 is engaged. Typically, the racking mechanism key lock 83 has two positions, one where the racking mechanism key 81 is trapped in the racking mechanism key lock 83 and another wherein the racking mechanism key 81 may be removed from the racking mechanism key lock 83. The mechanical interlock 109 is structured to prevent rotation of the racking mechanism key lock 83 between these two position. For example, the mechanical interlock 109 may be a solenoid wherein the plunger physically engages the racking mechanism key lock 83 and prevents rotation. When a user desired to operate the racking mechanism 80, the user must remove the racking mechanism key 81. The mechanical interlock 109 is controlled by the switch assembly selector 21A. That is, the mechanical interlock 109 will not disengage from the racking mechanism key lock 83 unless the bypass switch assembly is engaged by switch assembly selector 21A. Thus, a user must engage the bypass switch assembly 16 prior to releasing the racking mechanism key 81. As set forth above, engaging the bypass switch assembly 16 via the switch assembly selector 21A moves the first switch assembly 14 into the neutral position.

The transfer switch assembly 10 performs a transition to the bypass switch assembly 16 as follows. For the sake of this example, the system load 1 is coupled to, and in electrical communication with, the first energy source 2 via the first switch assembly 14. That is, the first switch assembly 14 is in the first configuration. While the bypass switch assembly 16 may be in the first configuration as well, it is preferable for the bypass switch assembly 16 to be in the neutral configuration during normal operation. That is, the bypass switch assembly 16 is not in the second configuration. The user initially actuates the switch assembly selector 21A and, as detailed above, the control system 18 moves the bypass switch assembly 16 into the first configuration, e.g. the configuration corresponding to the first switch assembly 14, and then moves the first switch assembly 14 into the neutral configuration. The user may then acquire the racking mechanism key 81. At this point in time, the system load 1 is receiving energy only via the bypass switch assembly 16.

The user may then open the door 13 using the handle assembly 17. In the event that the first switch assembly 14 was not moved into the neutral configuration via the switch assembly selector 21A, the door sensor 104 detects the movement of the door 13 to the open position and, as described above, moves the first switch assembly 14 to the neutral position.

If, the door 13 was not in place, or if the door sensor 104 was otherwise bypassed, the first switch assembly 14 could also be moved into the neutral configuration by the interlock assembly's 90 racking mechanism sensor 106. That is, after the user has properly configured the bypass switch assembly 16 to engage the power source 2, 3 to which the first switch assembly 14 is coupled, the user actuates the racking mechanism 80. When the racking mechanism 80 is actuated, the movement of the first switch assembly 14 relative to the enclosure 12 is detected by the racking mechanism sensor 106. When the control system 18 receives a signal from the racking mechanism sensor 106, the first switch assembly 14 is moved into the neutral configuration if not in that configuration already.

Once the first switch assembly 14 is in the neutral configuration, the first switch assembly 14 may be safely moved into either the test position or withdrawn for maintenance. During these activities, the first switch assembly 14 may be moved into the first or second configuration. As the configuration of the first switch assembly 14 may be different than the bypass switch assembly 16, the first switch assembly 14 is returned to neutral prior to being moved into the engaged position. This is, again, accomplished by the interlock assembly's racking mechanism sensor 106. That is, once the user actuates the racking mechanism 80 to move the first switch assembly 14 into the enclosure 12, the racking mechanism sensor 106 again detects the movement of the first switch assembly 14 relative to the enclosure 12 and sends a signal to the control system 18. When the control system 18 receives a signal from the racking mechanism sensor 106, the first switch assembly 14 is moved into the neutral configuration.

Once the racking-in procedure is completed, the control system 18 uses data from the position sensor 108 and the configuration sensors 110 to ensure that the first switch assembly 14 is in the engaged position before the first switch assembly 14 may be moved from the neutral configuration and that, when the first switch assembly 14 is moved from the neutral configuration, the first switch assembly 14 is moved into a configuration corresponding to the bypass switch assembly 16. That is, the control system 18 is structured so that the first switch assembly 14 will only be moved into an engaged configuration when the racking mechanism position sensor 108 indicates that the first switch assembly 14 is in the engaged position. The control system 18 is further structured to move the first switch assembly 14 into a configuration corresponding to the configuration of the bypass switch assembly 16.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. An interlock assembly for a bypass isolation open or closed transfer switch (ATS) assembly wherein energy is provided from a first energy source via a first source conductor, energy is provided from a second energy source via a second source conductor, energy is provided to a system load via a system load conductor, said ATS assembly includes at least a first switch assembly and a bypass switch assembly, said first switch assembly coupled to, and in electrical communication with, each of said first source conductor, said second source conductor, and said system load conductor, said first switch assembly structured to have three configurations, a first configuration wherein said first switch assembly couples, and provides electrical communication between, said first source conductor and said system load conductor, a second configuration wherein said first switch assembly couples, and provides electrical communication between, said second source conductor and said system load conductor, and a neutral configuration wherein neither said first source conductor nor said second source conductor is coupled to, and in electrical communication with, said system load conductor via said first switch assembly, said bypass switch assembly coupled to, and in electrical communication with, each of said first source conductor, said second source conductor, and said system load conductor, said bypass switch assembly structured to have three configurations, a first configuration wherein said bypass switch assembly couples, and provides electrical communication between, said first source conductor and said system load conductor, a second configuration wherein said bypass switch assembly couples, and provides electrical communication between, said second source conductor and said system load conductor, and a neutral configuration wherein neither said first source conductor nor said second source conductor is coupled to, and in electrical communication with, said system load conductor via said bypass switch assembly, said interlock assembly comprising:

an enclosure structured to enclose, and enclosing, said first switch assembly and said bypass switch assembly, said enclosure having a movable door;

said enclosure door movable between a closed position and an open position;

a control system structured to control a plurality of switch assemblies, said control system coupled to said first switch assembly and said bypass switch assembly and structured to place each said first switch assembly and said bypass switch assembly in one of said first, second, or neutral configurations;

a sensor system coupled to said control system and structured to provide a signal to said control system, said sensor system structured to determine the position of said door and to send a signal to said control system when said door is moved into said open position;

wherein, said control system is further structured to receive a signal from said sensor system indicating that said door has moved into said open position; and wherein, when said control system receives a signal from said sensor system indicating that said door has moved into said open position, said control system is further structured to move said at least one switch assembly into said neutral configuration.

2. The interlock assembly of claim 1 wherein said door sensor is disposed within said enclosure.

3. The interlock assembly of claim 1 wherein said first switch assembly includes a racking mechanism structured to move said first switch assembly in and out of said enclosure and wherein:

said sensor system has a racking mechanism sensor, said racking mechanism sensor structured to detect motion of said first switch assembly when said first switch assembly is moved by said racking mechanism and to send a signal to said control system; and wherein, when said control system receives a signal from said racking mechanism sensor, said control system is further structured to move said first switch assembly into said neutral configuration.

4. The interlock assembly of claim 1 wherein said first switch assembly and said bypass switch assembly each include a configuration sensor, each said configuration sensor electronically coupled to, and structured to provide a signal to, said control system said signal indicating the configuration of said associated switch assembly, and wherein:

said control system includes a memory, said memory structured to record the configuration of each switch assembly based on a signal provided by said configuration sensor; and said control system further structured to move said first switch assembly from a neutral configuration into a configuration corresponding to said bypass switch assembly.

5. The interlock assembly of claim 4 wherein said first switch assembly includes a racking mechanism structured to move said first switch assembly in and out of said enclosure and a position sensor, said position sensor structured to detect, and provide a signal to said control system, when said first switch assembly has fully engaged said first source conductor and said second source conductor, and wherein said control system is structured so that said first switch assembly is not moved from a neutral configuration into a configuration corresponding to said bypass switch assembly until said control system receives a signal from said position sensor indicating that said first switch assembly has fully engaged said first source conductor and said second source conductor.

6. The interlock assembly of claim 1 wherein:

each said first switch assembly and said bypass switch assembly include a movable contact arm; and each said movable contact arm being actuated by a single actuator.

7. A bypass isolation open or closed transition transfer switch (ATS) assembly having an interlock assembly structured to provide energy to a system load via a system load conductor and structured to receive energy from a first and a second source via conductors, a first source conductor and a second source conductor, said ATS assembly having an interlock assembly comprising:

a first switch assembly coupled to, and in electrical communication with, each of said first source conductor, said second source conductor, and said system load conductor, said first switch assembly structured to have three configurations, a first configuration wherein said first switch assembly couples, and provides electrical communication between, said first source conductor and said system load conductor, a second configuration wherein said first switch assembly couples, and provides electrical communication between, said second source conductor and said system load conductor, and a neutral configuration wherein neither said first source conductor nor said second source conductor is coupled to, and in electrical communication with, said system load conductor via said first switch assembly;

a bypass switch assembly coupled to, and in electrical communication with, each of said first source conductor, said second source conductor, and said system load conductor, said bypass switch assembly structured to have three configurations, a first configuration wherein said bypass switch assembly couples, and provides electrical communication between, said first source conductor and said system load conductor, a second configuration wherein said bypass switch assembly couples, and provides electrical communication between, said second source conductor and said system load conductor, and a neutral configuration wherein neither said first source conductor nor said second source conductor is coupled to, and in electrical communication with, said system load conductor via said bypass switch assembly;

an enclosure structured to enclose, and enclosing, said first switch assembly and said bypass switch assembly, said enclosure having a movable door;

said enclosure door movable between a closed position and an open position;

a control system structured to control a plurality of switch assemblies, said control system coupled to said first switch assembly and said bypass switch assembly and structured to place each said first switch assembly and said bypass switch assembly in one of said first, second, or neutral configurations;

a sensor system coupled to said control system and structured to provide a signal to said control system, said sensor system structured to determine the position of said door and to send a signal to said control system when said door is moved into said open position;

wherein, said control system is further structured to receive a signal from said sensor system indicating that said door has moved into said open position; and wherein, when said control system receives a signal from said sensor system indicating that said door has moved into said open position, said control system is further structured to move said at least one switch assembly into said neutral configuration.

8. The ATS assembly of claim 7 wherein:

each said first switch assembly and said bypass switch assembly include a movable contact arm; and each said movable contact arm being actuated by a single actuator.

9. The ATS assembly of claim 7 wherein:

said first switch assembly includes a racking mechanism structured to move said first switch assembly in and out of said enclosure;

said sensor system has a racking mechanism sensor, said racking mechanism sensor structured to detect motion of said first switch assembly when said first switch assembly is moved by said racking mechanism and to send a signal to said control system; and wherein, when said control system receives a signal from said racking mechanism sensor, said control system is further structured to move said first switch assembly into said neutral configuration.

10. The ATS assembly of claim 7 wherein:

said first switch assembly and said bypass switch assembly each include a configuration sensor, said configuration sensor coupled to, and structured to provide a signal to, said control system;

said control system includes a memory, said memory structured to record the configuration of each switch based on a signal provided by said configuration sensor; and said control system further structured to move said first switch assembly from a neutral configuration into a configuration corresponding to said bypass switch assembly.

11. The ATS assembly of claim 10 wherein:

said first switch assembly includes a racking mechanism structured to move said first switch assembly in and out of said enclosure;

said first switch assembly includes a position sensor, said position sensor structured to detect, and provide a signal to said control system, when said first switch assembly has fully engaged said first source conductor and said second source conductor, and wherein said control system is structured so that said first switch assembly is not moved from a neutral configuration into a configuration corresponding to said bypass switch assembly until said control system receives a signal from said position sensor that said first switch assembly has fully engaged said first source conductor and said second source conductor.

12. An interlock assembly for a bypass isolation open or closed transfer switch (ATS) wherein energy is provided from a first energy source via a first source conductor, energy is provided from a second energy source via a second source conductor, energy is provided to a system load via a system load conductor, said ATS assembly includes at least a first switch assembly and a bypass switch assembly, said first switch assembly coupled to, and in electrical communication with, each of said first source conductor, said second source conductor, and said system load conductor, said first switch assembly structured to have three configurations, a first configuration wherein said first switch assembly couples, and provides electrical communication between, said first source conductor and said system load conductor, a second configuration wherein said first switch assembly couples, and provides electrical communication between, said second source conductor and said system load conductor, and a neutral configuration wherein neither said first source conductor nor said second source conductor is coupled to, and in electrical communication with, said system load conductor via said first switch assembly, said first switch assembly further also including a racking mechanism structured to move said first switch assembly in and out of said enclosure, said racking mechanism having a rotating actuator, said rotating actuator including a cam surface, said bypass switch assembly coupled to, and in electrical communication with, each of said first source conductor, said second source conductor, and said system load conductor, said bypass switch assembly structured to have three configurations, a first configuration wherein said bypass switch assembly couples, and provides electrical communication between, said first source conductor and said system load conductor, a second configuration wherein said bypass switch assembly couples, and provides electrical communication between, said second source conductor and said system load conductor, and a neutral configuration wherein neither said first source conductor nor said second source conductor is coupled to, and in electrical communication with, said system load conductor via said bypass switch assembly, said interlock assembly comprising:

an enclosure structured to enclose, and enclosing, said first switch assembly and said bypass switch assembly;

a control system structured to control a plurality of switch assemblies, said control system coupled to said first switch assembly and said bypass switch assembly and structured to place each said first switch assembly and said bypass switch assembly in one of said first, second, or neutral configurations;

a sensor system coupled to said control system and structured to provide a signal to said control system;

said sensor system including a racking mechanism sensor, said racking mechanism sensor structured to detect motion of said first switch assembly when said first switch assembly is moved by said racking mechanism and to send a signal to said control system; and wherein, when said control system receives a signal from said racking mechanism sensor, said control system is further structured to move said first switch assembly into said neutral configuration.

13. The interlock assembly of claim 12 wherein:

each said first switch assembly and said bypass switch assembly include a movable contact arm; and each said movable contact arm being actuated by a single actuator.

14. The interlock assembly of claim 12 wherein said first switch assembly and said bypass switch assembly each include a configuration sensor, said configuration sensor coupled to, and structured to provide a signal to, said control system, and wherein:

said control system includes a memory, said memory structured to record the configuration of each switch based on a signal provided by said configuration sensor; and said control system further structured to move said first switch assembly from a neutral configuration into a configuration corresponding to said bypass switch assembly.

15. The interlock assembly of claim 14 wherein said first switch assembly includes a racking mechanism structured to move said first switch assembly in and out of said enclosure and a position sensor, said position sensor structured to detect, and provide a signal to said control system, when said first switch assembly has fully engaged said first source conductor and said second source conductor, and wherein said control system is structured so that said first switch assembly is not moved from a neutral configuration into a configuration corresponding to said bypass switch assembly until said control system receives a signal from said position sensor indicating that said first switch assembly has fully engaged said first source conductor and said second source conductor.

16. The ATS assembly of claim 12 wherein:
each said first switch assembly and said bypass switch assembly include a movable contact arm; and
each said movable contact arm being actuated by a single actuator.

17. A bypass isolation open or closed transition transfer switch (ATS) assembly having an interlock assembly structured to provide energy to a system load via a system load conductor and structured to receive energy from a first and a second source via conductors, a first source conductor and a second source conductor, said closed transition ATS assembly having an interlock assembly comprising:
a first switch assembly coupled to, and in electrical communication with, each of said first source conductor, said second source conductor, and said system load conductor, said first switch assembly structured to have three configurations, a first configuration wherein said first switch assembly couples, and provides electrical communication between, said first source conductor and said system load conductor, a second configuration wherein said first switch assembly couples, and provides electrical communication between, said second source conductor and said system load conductor, and a neutral configuration wherein neither said first source conductor nor said second source conductor is coupled to, and in electrical communication with, said system load conductor via said first switch assembly, said first switch assembly also including a racking mechanism structured to move said first switch assembly in and out of said enclosure, said racking mechanism having a rotating actuator, said rotating actuator including a cam surface;
a bypass switch assembly coupled to, and in electrical communication with, each of said first source conductor, said second source conductor, and said system load conductor, said bypass switch assembly structured to have three configurations, a first configuration wherein said bypass switch assembly couples, and provides electrical communication between, said first source conductor and said system load conductor, a second configuration wherein said bypass switch assembly couples, and provides electrical communication between, said second source conductor and said system load conductor, and a neutral configuration wherein neither said first source conductor nor said second source conductor is coupled to, and in electrical communication with, said system load conductor via said bypass switch assembly;
an enclosure structured to enclose, and enclosing, said first switch assembly and said bypass switch assembly;
a control system structured to control a plurality of switch assemblies, said control system coupled to said first switch assembly and said bypass switch assembly and structured to place each said first switch assembly and said bypass switch assembly in one of said first, second, or neutral configurations;
a sensor system coupled to said control system and structured to provide a signal to said control system;
said sensor system including a racking mechanism sensor, said racking mechanism sensor structured to be engaged and actuated by said racking mechanism cam surface and to send a signal to said control system when engaged; and
wherein, when said control system receives a signal from said racking mechanism sensor, said control system is further structured to move said at least one switch assembly into said neutral configuration.

18. The ATS assembly of claim 17 wherein said first switch assembly and said bypass switch assembly each include a configuration sensor, said configuration sensor coupled to, and structured to provide a signal to, said control system, and wherein:
said control system includes a memory, said memory structured to record the configuration of each switch based on a signal provided by said configuration sensor; and
said control system further structured to move said first switch assembly from a neutral configuration into a configuration corresponding to said bypass switch assembly.

19. The ATS assembly of claim 18 wherein said first switch assembly includes a racking mechanism structured to move said first switch assembly in and out of said enclosure, said racking mechanism having a position sensor, said racking mechanism position sensor structured to detect, and provide a signal to said control system, when said first switch assembly has fully engaged said first source conductor and said second source conductor, and wherein said control system is structured so that said first switch assembly is not moved from a neutral configuration into a configuration corresponding to said bypass switch assembly until said control system receives a signal from said racking mechanism position sensor.

* * * * *